US012614462B2

(12) United States Patent
Andreetto et al.

(10) Patent No.: US 12,614,462 B2
(45) Date of Patent: Apr. 28, 2026

(54) AUTOMOTIVE COOPERATIVE MAP-FREE LANE-LEVEL RELATIVE LOCALIZATION BASED ON INTER-VEHICULAR COMMUNICATION

(71) Applicant: C.R.F. SOCIETA' CONSORTILE PER AZIONI, Orbassano (IT)

(72) Inventors: Marco Andreetto, Orbassano (IT); Pietro Postal, Orbassano (IT); Marco Darin, Orbassano (IT); Nicola Poerio, Orbassano (IT); Andrea Steccanella, Orbassano (IT); Filippo Visintainer, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 286 days.

(21) Appl. No.: 18/276,747

(22) PCT Filed: Feb. 7, 2022

(86) PCT No.: PCT/IB2022/051047
§ 371 (c)(1),
(2) Date: Aug. 10, 2023

(87) PCT Pub. No.: WO2022/172146
PCT Pub. Date: Aug. 18, 2022

(65) Prior Publication Data
US 2024/0105060 A1 Mar. 28, 2024

(30) Foreign Application Priority Data
Feb. 15, 2021 (IT) ........................ 102021000003383

(51) Int. Cl.
*G08G 1/16* (2006.01)
*G08G 1/0967* (2006.01)
*H04W 4/46* (2018.01)

(52) U.S. Cl.
CPC ....... *G08G 1/167* (2013.01); *G08G 1/096791* (2013.01); *G08G 1/163* (2013.01); *H04W 4/46* (2018.02)

(58) Field of Classification Search
CPC .. G08G 1/167; G08G 1/096791; G08G 1/163; H04W 4/46
See application file for complete search history.

(56) References Cited

U.S. PATENT DOCUMENTS 8,635,013 B2 * 1/2014 Zuccotti ............. G08G 1/09675
340/471
10,683,016 B2 * 6/2020 Visintainer ............ G01C 21/30
(Continued)

FOREIGN PATENT DOCUMENTS

EP 3141926 A1 3/2017

OTHER PUBLICATIONS

International Search Report and Written Opinion of the ISA issued in PCT/IB2022/051047, mailed Jun. 3, 2022; ISA/EP.
(Continued)

*Primary Examiner* — Peter D Nolan
*Assistant Examiner* — Wae L Louie

(57) ABSTRACT

An automotive electronic system configured for automotive cooperative lane-level relative localization based on inter-vehicular communication of two motor vehicles each equipped with such a system. The system of each vehicle includes: an automotive sensory system including sensors configured to identify a right lane line and a left lane line to delimit a lane of travel for the motor vehicle on a roadway, the sensors further configured to generate an output identifying location of the right lane line and the left lane line; an automotive geo-location system; an automotive communication interface; and automotive electronic storing and processing resources including a storage medium storing
(Continued)

instructions that when executed by a processor cause the processor to communicate with the automotive sensory system to receive the output, communicate with the automotive geo-location system to receive the position data, and communicate with the automotive communication interface and to allow the lane-level relative localization.

10 Claims, 9 Drawing Sheets

(56)                References Cited

U.S. PATENT DOCUMENTS

| | | | | |
|---|---|---|---|---|
| 11,518,394 | B2 * | 12/2022 | Visintainer | ......... B60R 16/0239 |
| 2016/0321928 | A1 | 11/2016 | Segarra | |
| 2017/0025018 | A1 | 1/2017 | Gignac et al. | |
| 2018/0182244 | A1 | 6/2018 | Zhang et al. | |
| 2019/0001993 | A1 * | 1/2019 | Visintainer | ........... B60W 50/14 |
| 2020/0116499 | A1 | 4/2020 | Jung et al. | |
| 2020/0207343 | A1 | 7/2020 | Vassilovski et al. | |
| 2020/0219399 | A1 * | 7/2020 | Pfeifle | .................. G06N 3/0464 |
| 2021/0024061 | A1 * | 1/2021 | Visintainer | ....... B60W 30/0956 |
| 2021/0046941 | A1 * | 2/2021 | Visintainer | ...... G08G 1/096791 |
| 2021/0118295 | A1 * | 4/2021 | Visintainer | ...... G08G 1/096861 |
| 2024/0105060 | A1 * | 3/2024 | Andreetto | .............. G08G 1/163 |

OTHER PUBLICATIONS

"The Potential Regulatory Challenges of Increasingly Autonomous Motor Vehicles," by Stephen P. Wood et al., Santa Clara Law Review, vol. 52 | No. 4 | Article 9, dated Dec. 20, 2012.

"Automotive revolution—perspective towards 2030; How the convergence of disruptive technology-driven trends could transform the auto industry," McKinsey&Company, Advanced Industries, Jan. 2016.

"Lane Level Map-Matching Method for Vehicle Localization Using GPS and Camera on a High-Definition Map" by Jeong Min Kang, Tae Sung Yoon, Euntai Kim, and Jin Bae Park, from the Dept. of Electrical and Electronic Engineering Yonsei University Seoul and the Dept. of Electrical Engineering, Changwon National Universary Changwon, Published Apr. 11, 2020.

"Technologies for autonomous, connected and cooperative mobility: the state of the art," by Stefano Arrigoni; Mattia Brambilla, Federico Cheli, and Monica Nicoli of Politecnico di Milano, dated Jun. 6, 2019.

"On-Board System Requirements for V2V Safety Communication," SAE International® Surface Vehicle Standard J2945™/1, issued Mar. 2016.

* cited by examiner

Key:

Following Motor Vehicle

Position Transmitted by the Preceding Motor Vehicle

Lane lines Detected by Following Motor Vehicle

Right and Left Distances Computed by the Preceding Motor Vehicle

○ Hypothetical Positions of the Preceding Motor vehicle

□ Best Hypothetical Position of the Preceding Motor Vehicle

AUTOMOTIVE COOPERATIVE MAP-FREE LANE-LEVEL RELATIVE LOCALIZATION BASED ON INTER-VEHICULAR COMMUNICATION

CROSS-REFERENCE TO RELATED APPLICATIONS

This patent application is a U.S. National Phase Application under 35 U.S.C. 371 of International Application No. PCT/IB2022/051047, filed on Feb. 7, 2022, which claims the benefit of Italian patent application no. 102021000003383 filed on Feb. 15, 2021. The entire disclosures of the above identified applications are incorporated herein by reference.

TECHNICAL FIELD OF THE INVENTION

The present invention relates in general to automotive driver assistance, and in particular to automotive cooperative map-free lane-level relative localization based on inter-vehicular communication.

The present invention finds application in any type of road motor vehicle, both for the transport of people, such as a passenger car, a bus, a camper van, etc., and for the transport of goods, such as an industrial motor vehicle (lorry, truck-trailer, articulated vehicle, etc.) or a light or medium-heavy commercial motor vehicle (van, panel van, chassis cab, etc.).

BACKGROUND OF THE INVENTION

In the article *Technologies for autonomous, connected and cooperative mobility: the state of the art* by Stefano Arrigoni, Mattia Brambilla, Federico Cheli and Monica Barbara Nicoli from Politecnico of Milan, published in 2019 in the EU Digital Journal, a detailed overview is provided about the main technologies that are protagonists of the current transformation of the automotive industry, whose challenges, particularly those related to urban mobility, are multiple and not easy to solve: road safety, sustainability in terms of environmental impact and costs, pollution, traffic congestion, etc.

To meet these needs, the main trends driving the transport revolution are, as outlined in McKinsey & Company's *Automotive Revolution—Perspective Towards* 2030, January 2016, diverse mobility and car sharing, self-driving, electrification and connectivity, all part of an ongoing evolution towards Cooperative Intelligent Transport Systems (C-ITS).

As far as self-driving is concerned, in recent years car manufacturers have invested considerable resources in researching advanced motor vehicle driving assistance/aid systems (Advanced Driver Assistance Systems—ADAS) to improve driving safety and comfort.

For this reason and due to the fact that they will help achieve the goals set by the European Union for reducing road accidents, ADAS are one of the fastest growing segments in the automotive sector and bound to become increasingly popular in the years to come.

ADAS safety features are designed to avoid collisions and accidents by offering technologies that warn drivers of potential problems, or to avoid collisions by implementing safeguard measures and taking control of the motor vehicles. Adaptive features can automate lighting, provide adaptive cruise control, automate braking, incorporate GPS/traffic signalling, connect smartphones, alert drivers of other motor vehicles of hazards, keep drivers in the right lane, or show what is in blind spots.

ADAS technology is based on vision/camera systems, sensory systems, automotive data networks, vehicle-to-vehicle (V2V) or vehicle-to-infrastructure (V2I) communication systems. Next-generation ADAS systems will increasingly take advantage of wireless connectivity to offer added value to V2V or V2I communication.

According to studies conducted by the Accident Research of the German Association of Insurers (GDV), in fact, lane departure warning systems alone are able to prevent up to 15% of road accidents, while assistance at intersections can avoid up to 35% of road accidents.

Technological developments such as radar and camera integration, and the fusion of sensory data from multiple applications, are expected to bring about a change in motor vehicles that will be more substantial over the next two decades than it has been in the 130 years that have elapsed since the first motor vehicle saw the light of day.

The end-point of these technological developments is usually defined as self-driving cars or autonomous cars.

The two terms are overwhelmingly most often used interchangeably, as in the present discussion, whereas, instead, in some specialized environments these two terms are used differently to make subtle distinctions.

In particular, the term autonomous cars was used to indicate those cars that resemble today's cars, i.e. with the seats facing forward and a steering wheel, and wherein the driver is deprived of driving tasks only in certain circumstances, for example for self-parking or self-braking or for Adaptive Cruise Control to adjust the speed so as to maintain a safe distance from the cars ahead. In the near future, autonomous cars could take total control of the driving in heavy traffic or on motorways.

The term self-driving cars has instead been used to indicate those cars that are considered to represent a step forward compared to autonomous cars, i.e. cars in which the steering wheel will completely disappear, and which will make the whole trip by using the same sensory system used by autonomous cars.

Disregarding this subtle distinction, the true distinction is between assisted driving motor vehicles, where the motor vehicle "assists" the driver (who is therefore not exempt from paying attention), by braking if the vehicle in front brakes, slowing down when required, and so on, and automatic or automated driving motor vehicles, where the motor vehicle, unlike the above one, drives fully autonomously and the driver may not pay attention.

An example of this terminological distinction is given by the article by Wood et al, (2012), in which the author writes: "This article generally uses the term autonomous instead of the term automated. The term "autonomous" was chosen "because it is the term that is currently in more widespread use (and thus is more familiar to the general public). However, the term "automated" is arguably more accurate as it connotes control or operation by a machine, while "autonomous" connotes acting alone or independently. Currently, most vehicles (which do not know they have a person in the seat), use communication with the Cloud, or with other vehicles, and do not enter the destination independently. This is why the term "automated" would be better to describe this vehicle concept".

In 2014, SAE (Society of Automotive Engineers) International, a standardization body in the aerospace, automotive and vehicle industry that works on developing and defining engineering standards for motorized vehicles of all kinds, including cars, trucks, ships and aircraft, published a new International Standard J3016, which defined six different levels for automatic driving. This classification is based on how much the driver has to intervene on the motor vehicle, rather than on the motor vehicle's capabilities.

The six levels of automatic driving are:

Level 0—No automation: The driver must take care of all driving aspects, with no electronic support;

Level 1—Driver assistance: The driver must take care of all driving aspects, but is supported with information (in the form of visual or acoustic alerts) by electronic systems that can signal the presence of dangerous situations or adverse conditions. At this level, the car merely analyses and represents the situations, thus the driver has total and full responsibility for driving the vehicle;

Level 2—Partial automation: The driver takes care of the driving, but there is a first driving integration. At this level, the motor vehicle intervenes in acceleration and braking through safety systems, such as for example brake assist and anti-collision emergency braking. The direction and traffic control are still under the control of the driver, although in certain scenarios with clearly visible road surface marking, the steering can be managed in a partially automated way (systems called Lane Keeping Assist, and in the most complete versions Traffic Jam Assist, Autosteer, Highway Assist, depending on the car brand);

Level 3—Conditional automation: the motor vehicle is able to manage the driving in ordinary environmental conditions, managing acceleration, braking and direction, while the driver intervenes in problematic situations in the event of a system request or if the driver himself/herself verifies adverse conditions;

Level 4—High automation: The automatic system is able to manage any eventuality, but must not be activated in extreme driving conditions as in case of bad weather;

Level 5—Full automation: The automatic driving system is able to manage all situations that can be managed by humans, without any human intervention.

In the aforementioned article from the Politecnico of Milan, it is also highlighted that a further fundamental aspect in the evolution towards self-driving is represented by V2X communication technologies, which are designed to enable a direct Vehicle-to-Everything communication between motor vehicles, the road infrastructure and road users (pedestrians, cyclists, etc.), for real-time sharing of information relating to road conditions and traffic. The goal is to increase awareness of what happens in the driving environment, reducing the detection and reaction times to potentially risky events (such as the presence of a pedestrian on the road) and improving the mutual coordination of motor vehicle manoeuvres (such as synchronization in convoys of motor vehicles at a short distance from each other in the so-called platooning).

The role of connectivity becomes particularly relevant as the level of automation increases. The exchange of data between motor vehicles and infrastructure is in fact indispensable in fully self-driving systems (level 5) to ensure safe and at the same time efficient mobility.

This is why major car manufacturers, in partnership with the telecommunications industries, have in recent years accelerated experimentation with ADAS incorporating V2X communication devices inside. A strong push towards the deployment of these technologies is provided by the 5G Automotive Association (5GAA) consortium, which since 2016 has embarked on a path of collaboration between ICT companies and the automotive sector to promote the integration of cellular V2X technologies in the transformation process towards a connected transport system.

Autonomous motor vehicles in fact exploit massive sensors (inertial units, radar, lidar, video cameras, ultrasounds and GPS receivers) to monitor the surrounding environment and an on-board computer to adjust the longitudinal and lateral dynamics of the motor vehicles based on what comes from the sensors. Without cooperation, however, the perception is limited by the range of coverage of the sensors (e.g. for radars about 250 m) and the uncertainty on the trajectories planned by the other motor vehicles forces distances to be redetermined, limiting manoeuvring efficiency in scenarios with high traffic density.

Direct communication between motor vehicles (V2V) and with the infrastructure (V2I) extends these perception/control capabilities by enabling so-called "cooperative" mechanisms. Through V2V interaction, vehicles can merge sensor data in real time and build high-resolution digital road maps of the road environment, extending the horizon of perception far beyond their field of vision and increasing safety. The V2V exchange also allows to coordinate and synchronize the trajectories, reducing the inter-distance safely, with benefits in terms of traffic flow and efficiency.

Cooperative self-driving prospectively requires the development of new V2X technologies that support ultra-fast (with latency in the order of ms) and continuous (with 10–5 reliability) exchange of large volumes of data (up to 1 Gb/s), even in highly dynamic conditions (up to 250 km/h).

Dedicated V2X technologies available today operate at 5.9 GHz and are designed for the deployment of C-ITS services mainly for assisted or partially self-driving, through the broadcast of safety/traffic alert messages. The first vehicle-to-vehicle cooperative communication system was defined in the IEEE 802.11p standard in 2007 and has found application in the IEEE 1609 and SAE DSRC J2945-J2735 standards in North America and ETSI ITS-G5 in Europe since 2009. More recently, in 2016, the 3GPP C-V2X cellular technology was introduced, with the Release 14 of the LTE (4G) standard.

While the first technology (ETSI ITS-G5) has been extensively tested over the last ten years, making it thus mature and ready for commercialisation, the second one (3GPP C-V2X) has only recently been released and has therefore only been field-tested for a few months, and many of the performance analyses available today are based on simulations. Both technologies offer the possibility of direct V2V, V2I and V2P (vehicle-pedestrian) communications without the need for a network infrastructure to support them, and are therefore able to support cooperative mobility services even in unfavourable environmental conditions. They have been designed to support basic road safety services, in accordance with the ETSI EN 302 637 specifications, where CAM (Cooperative Awareness Messages) and DENM (Decentralized Environmental Notification Messages) are defined, the former concerning the status of each road user, the latter reporting the occurrence of specific and occasional events (e.g. accidents).

However, the low bandwidth availability below 6 GHz limits the transmission capacity of these systems, and next-generation technologies are needed to support advanced C-ITS cooperative perception/control functions, as self-driving systems today generate an aggregate flow of around 10 Gbps, and the end-to-end latency required for a stable cooperative control in close-range vehicles is estimated to be around 1-10 ms.

To support such advanced systems, 5G systems are being developed for increased Tactile Internet connectivity, i.e. with ultra-high reliability, ultra-low latency and high transmission capacity, called Ultra-Reliable Low-Latency Communications (URLLC). With the Release 15 of the 3GPP cellular standard, a new 5G V2X technology is being defined that guarantees superior performance compared to 4G, for example reducing latency from 20 ms to 10 ms.

Work has also begun on the development of Release 16 (5G New Radio, NR), which will deliver high-capacity, ultra-fast and ultra-reliable connectivity capable of enabling any advanced mobility service. For example, it will be possible to share high-resolution video data produced by on-board imaging systems (camera, radar, lidar) in real time to extend the field of vision. Realising see-through type applications where a motor vehicle obscured by a truck in front will be able to receive high-quality visual information from the cameras installed on the truck itself, gaining visibility and having a greater perception of the environment; realising ultra-fast cooperative control systems for high density platooning.

In the end, in the aforementioned article from the Politecnico of Milan, it is highlighted that a further fundamental aspect in the evolution towards self-driving is also represented by geo-location, the accuracy of which must always be increasingly high as the level of autonomy increases, to the point of guaranteeing an error of less than 10 cm for the most advanced C-ITS services.

However, the automotive satellite geo-location carried out through automotive localization systems based on Radio Signals in Space (SIS) transmitted by a constellation of satellites of a Global Navigation Satellite System (GNSS), albeit augmented with differential corrections, fails to guarantee such precision in complex propagation scenarios such as urban ones. Scientific research is therefore exploring cooperative mechanisms that exploit the vehicular network to merge position information collected by different vehicles and increase the precision of satellite localization (GNSS augmentation).

In order to improve the precision of satellite geo-location so that it can achieve lane-level localization in outdoor environments, in the article *Lane-Level Map-Matching Method for Vehicle Localization Using GPS and Camera on a High-Definition Map* by Jeong Min Kang, Tae Sung Yoon, Euntai Kim and Jin Bae Park 1 from the Departments of Electrical and Electronic Engineering at Yonsei and Changwon Universities in Korea, it is proposed a localization based on high definition maps, and in particular on the road links present in such maps, and on a single camera, through which images of the road in front of the motor vehicles are captured, which, after an appropriate processing (inverse perspective mapping and Hough transformation), allow to identify the road lanes in the captured images and then derive information on the road links related to the lanes traveled by the motor vehicles.

US 2020/207343 A1 relates to the determination and transmission to nearby motor vehicles of intra-lane position data indicative of the intra-lane position of a motor vehicle indicative of the lateral distance of the motor vehicle from a lane reference point on the basis of data outputted by one or more sensors of the motor vehicle. Nearby motor vehicles are then instructed to perform one or more actions based on the intra-lane position data.

US 2017/025018 A1 relates to the generation and communication of lane information from a motor vehicle to a vehicle-to-vehicle (V2V) network, wherein visual data are first collected by a camera, a lane is then detected within the visual data, which is then classified based on the visual data and a confidence level is assigned to the lane classification, the lane distance is then estimated based on the visual data and a lane model is generated based on the lane classification and the lane distance estimation, and the lane model and confidence level are then transmitted to the V2V network.

OBJECT AND SUMMARY OF THE INVENTION

The Applicant has ascertained that for the implementation of some V2V-based ADAS applications, such as, for example, those addressed in SAE J2945/1, Emergency Electronic Braking Lights (EEBL), Slow Vehicle Warning (SVW), Lane Change Assist (LCA) and Cooperative Adaptive Cruise Control (C-ACC), the precision of traditional automotive satellite geo-location technology is in fact insufficient to allow a lane-level localization of the motor vehicles, just as the lane-level automotive satellite geo-location based on high-definition digital road maps proposed in the above-mentioned article is hardly practicable in practice, if not actually completely impracticable, for a number of reasons including: the lack (at least at present) of digital road maps with a definition such as to allow a lane-level localization, the high cost for producing digital road maps that also contain data indicative of the road lanes (usually known as ADAS maps and, therefore, with a definition such as to allow a lane-level localization of the motor vehicles) and the absolute necessity for digital road maps to be constantly updated, with the consequent loss of reliability thereof, which is clearly a critical factor in the safety of the passengers of the motor vehicles and other road users.

The aim of the present invention is hence to provide a technology that enables automotive lane-level localization even in the absence of digital road maps.

According to the present invention, an automotive cooperative lane-level relative localization electronic system based on inter-vehicular communication and relevant software are provided, as claimed in the appended claims.

DETAILED DESCRIPTION OF PREFERRED EMBODIMENTS OF THE INVENTION

The present invention will now be described in detail with reference to the accompanying drawings in order to allow a skilled person to implement it and use it. Various modifications to the described embodiments will be readily apparent to those of skill in the art and the general principles described may be applied to other embodiments and applications without however departing from the protective scope of the present invention as defined in the appended claims. Therefore, the present invention should not be regarded as limited to the embodiments described and illustrated herein, but should be allowed the broadest protection scope consistent with the features described and claimed herein.

Unless otherwise defined, all technical and scientific terms used herein have the same meaning commonly understood by one of ordinary skill in the art to which the invention belongs. In case of conflict, the present specification, including the definitions provided, will control. Furthermore, the examples are provided for illustrative purposes only and as such should not be considered limiting.

In particular, the block diagrams included in the attached figures and described below are not to be understood as a representation of the structural features, i.e. constructional limitations, but must be understood as a representation of functional features, i.e. intrinsic properties of the devices defined by the effects obtained, that is to say functional restrictions, which can be implemented in different ways, so as to protect the functionalities thereof (operational capability).

In order to facilitate the understanding of the embodiments described herein, reference will be made to some specific embodiments and a specific language will be used to describe the same. The terminology used herein is used for the purpose of describing particular embodiments only, and is not intended to limit the scope of the present invention.

In a nutshell, the idea behind the present invention is to provide an automotive cooperative map-free lane-level relative localization which is:

relative because it allows the relative position of a first motor vehicle to be determined with respect to a second motor vehicle, lane-level because it allows to determine whether the two motor vehicles are in the same or different lanes, cooperative because it is based on V2V communication between the two motor vehicles, which, hence, must necessarily be sensorised motor vehicles capable of sending and receiving automotive messages from/to motor vehicles or an infrastructure, sensing the surrounding environment and interacting with other motor vehicles or entities, and even in the absence of digital road maps required for implementing map-matching techniques.

The automotive cooperative lane-level relative localization technology according to the present invention will be described below at a theoretical level with reference to FIGS. 1 and 2.

Figures 1A, 1B, 1C:
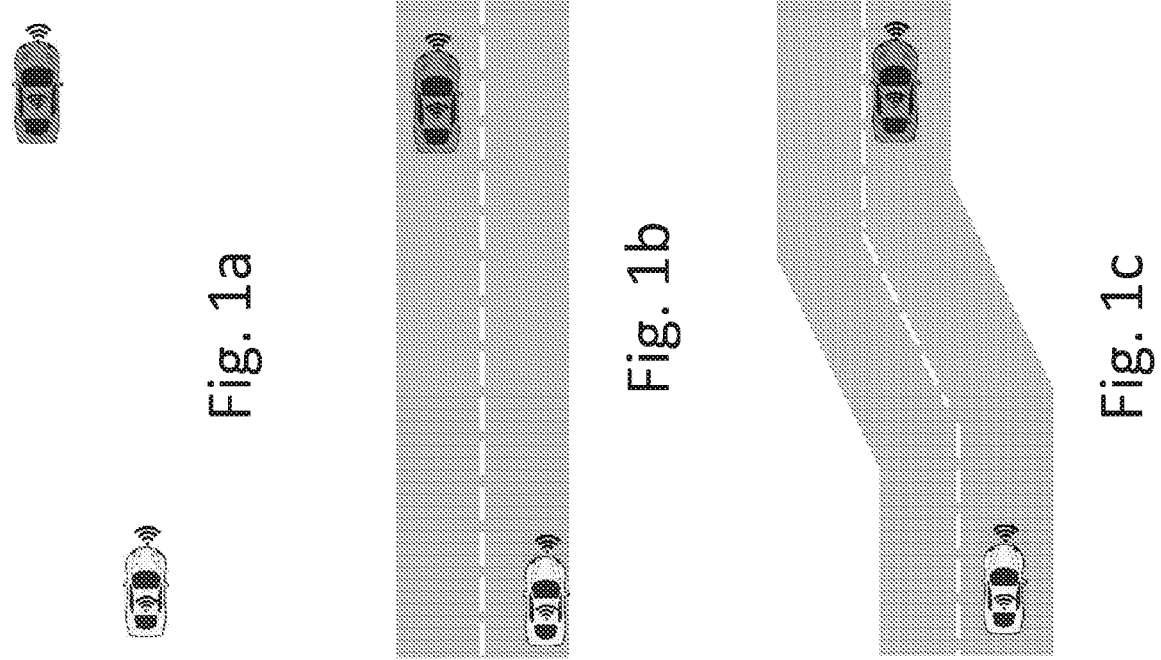
FIGS. 1a, 1b and 1c show two road scenarios that demonstrate that the precision of traditional automotive satellite geo-location is insufficient to enable a lane-level localization of the motor vehicles.

In particular, FIGS. 1*a*-1*c* show two road scenarios that demonstrate that the precision of traditional automotive satellite geo-location is insufficient to enable a lane-level localization of the motor vehicles.

In particular, FIG. 1*a* shows two motor vehicles, of which one is preceding and one is following, arranged in respective geographical positions determined based on traditional automotive satellite geo-location technology.

FIG. 1*b* shows the two motor vehicles shown in FIG. 1*a* along a straight road, while FIG. 1*c* shows the two motor vehicles shown in FIG. 1*a* along a non-straight road.

From the comparison of FIGS. 1*a*, 1*b* and 1*c* it is possible to appreciate how the conformation of the road can ensure that, although the relative position of the two motor vehicles determined on based a traditional automotive satellite geo-location technology is always the same, in the first road scenario shown in FIG. 1*b* the preceding motor vehicle is in a different lane than the one of the following motor vehicle, while in the second road scenario shown in FIG. 1*c* the road has such a development that the preceding motor vehicle is in the same lane as the one of the following motor vehicle.

Consequently, in the first road scenario shown in FIG. 1*b* the preceding motor vehicle is not along the path of the following motor vehicle and, hence, does not represent a potential obstacle for the latter along its path, in the second road scenario shown in FIG. 1*c*, on the other hand, the preceding motor vehicle is along the path of the following motor vehicle and, hence, might represent a potential obstacle for the latter.

For this reason, therefore, unlike in the first road scenario shown in FIG. 1*b*, in the second road scenario shown in FIG. 1*c* the preceding motor vehicle could potentially adversely affect, and in particular pose a potential threat to the driving safety of the following motor vehicle along its path by being able to be collided with by the following motor vehicle.

The idea underlying the present invention is therefore to exploit V2V communication between the two motor vehicles to cause the preceding motor vehicle to transmit V2V messages containing, in addition to basic data representative of basic information of geographical positioning, motion and status of the preceding motor vehicle, also data representative of the distances of the preceding motor vehicle from the right and left lane lines which delimit the lane the preceding motor vehicle is traveling along, hereinafter referred to as right and left distances.

While the geographical position of the preceding motor vehicle is outputted by the automotive geo-location system of the preceding motor vehicle, be it satellite-based or based on other technology, the left and right distances of the preceding motor vehicle from the left and right lane lines which delimit the lane the preceding motor vehicle is traveling along are instead computed based on information provided by the preceding motor vehicle, in particular by the automotive sensory system thereof, which must therefore be suitable for the purpose, i.e., based on any present or future technology that allows lane lines to be the identified and left and right distances of a motor vehicle from the identified right and left lane lines to be computed.

An automotive sensory system suitable for the purpose could be, for example, represented by the ultrasonic sensory system of the Park Assist system or, conveniently, by the automotive vision system of the Lane Keeping and Lane Centering systems, which must be suitably programmed to allow left and right distances to be computed by electronically processing digital images captured by a standard production ADAS camera, namely the one traditionally used by ADASes currently on the market to implement camera-based ADAS functions, which, depending on the standard production equipment of the motor vehicle, may take the form of a low resolution black and white camera or a high resolution colour camera.

As is known, in fact, an ADAS camera integrates a dedicated electronic digital image processor able to perform several processing operations simultaneously on the digital images captured by the ADAS camera for the implementation of different ADAS applications, such as the recognition, at the current state of the art, of the (only) lane traveled by the motor vehicle, the detection of moving and approaching motor vehicles, the control of the distribution of the external lighting of the motor vehicle, the detection of the preceding motor vehicles, the detection of pedestrians, the recognition of traffic signals, etc.

Therefore, in one embodiment, the electronic digital image processor of the ADAS camera of the preceding motor vehicle can be programmed to:

process the digital images captured by the ADAS camera to (try to) recognise one or both of the right and left lane lines which delimit the lane being traveled by the preceding motor vehicle, assume, if only one of the lane lines were recognised in the digital images captured by the ADAS camera, the unrecognised lane line as being parallel to the recognised lane line and placed at a distance from the latter which may be equal to the lane width computed last time that both of the right and left lane lines were recognised in the digital images captured by the ADAS camera or equal to the average of the last n computed values of the lane width or still equal to a lane width estimated through a Kalman filter, through recursive least squares with forgetting factor, or other estimation algorithm, or again, if no lane width was still computed, equal to the standard lane width, and, subsequently, compute the right and left distances based on the recognised lane lines and output data indicative of the computed left and right distances.

In a different embodiment, the processing of the digital images captured by the ADAS camera aimed at recognising the right and left lane lines which delimit the lane the preceding motor vehicle is traveling along and at computing the left and right distances from the right and left lane lines may be delegated to electronic processing resources of the preceding motor vehicle external to the ADAS camera, e.g., a central processing node of the preceding motor vehicle dedicated to processing the digital images captured by all the on-board cameras of the preceding motor vehicle.

The data representative of the left and right distances can be transmitted by the preceding motor vehicle, along with the data representative of the geographical position currently already transmitted in this way, using existing V2V messages, such as Basic Safety Messages (BSMs) or Cooperative Awareness Messages (CAMs), or new messages under investigation by the automotive research community for a possible standardisation thereof, such as Collective Perception Messages (CPM), Cooperative Sensing Messages (CSM) or Decentralized Environmental Notification Messages (DENM).

Figure 2:
FIG. 2 shows how information transmitted by a preceding motor vehicle can be used by a following motor vehicle proceeding in the same direction of travel as the preceding motor vehicle to lane-level localize the preceding motor vehicle relatively to itself according to the present invention.
Figure 2:
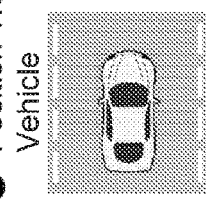
Figure 2:
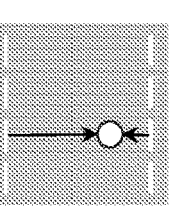
Figure 2:
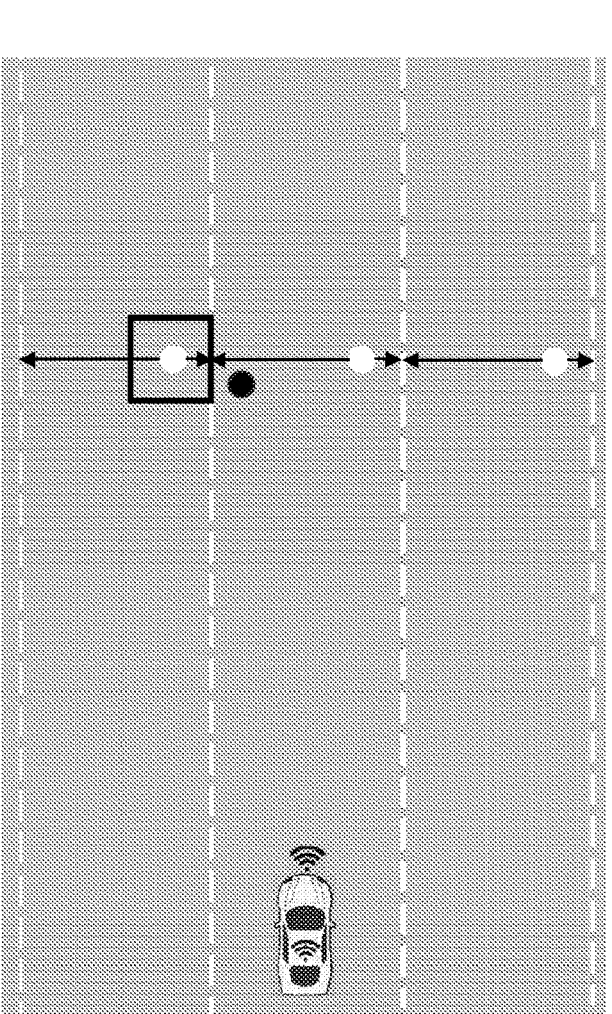

FIG. 2 shows how information transmitted by the preceding motor vehicle can be used by the following motor vehicle to lane-level localize the preceding motor vehicle with respect to itself according to the present invention.

As mentioned above, the following motor vehicle receives a V2V message from the preceding motor vehicle containing position data indicative of both the current geographical position of the preceding motor vehicle, which in FIG. 2 is represented by a black dot, and of the right and left distances, which in FIG. 2 are represented by arrows, of the preceding motor vehicle from the right and left lane lines which delimit the lane the preceding motor vehicle is traveling along.

FIG. 2 also shows a multi-lane road scenario, in which the central lane is identified by the following motor vehicle through its own automotive sensory system, while the lateral lanes are assumed to be parallel lanes to the one identified. FIG. 2 also shows the possible geographical positions that the preceding motor vehicle can assume in the road scenario shown, represented in FIG. 2 by respective white dots, and which are compatible with the right and left distances of the preceding motor vehicle from the right and left lane lines which delimit the lane the preceding motor vehicle is traveling along.

In the multi-lane road scenario shown in FIG. 2, only one of the possible geographical positions of the preceding motor vehicle is compatible with the current geographical position of the preceding motor vehicle, namely the one closest to the current geographical position of the preceding motor vehicle and enclosed in the black rectangle shown.

Therefore, based on the knowledge of:

the right and left lane lines which delimit the lane the following motor vehicle is traveling along and that are identified by the latter based on the information outputted by its own ADAS camera, the current geographical position of the preceding motor vehicle transmitted by the latter and outputted by its own automotive geo-location system, the current geographical position of the following motor vehicle outputted by its own automotive geo-location system, and the left and right distances of the preceding motor vehicle from the right and left lane lines which delimit the lane the preceding motor vehicle is traveling along and which are identified by the latter based on the information outputted by its own ADAS camera, the following motor vehicle is then able to determine, without the use of ADAS maps, that:

the preceding motor vehicle is traveling closer to the right lane line of the lane the preceding motor vehicle is traveling along, the current geographical position of the preceding motor vehicle is closer to the left lane line of the lane the following motor vehicle is traveling along, and, hence, the preceding motor vehicle cannot consequently be in the same but in a different lane than that of the following motor vehicle, thus lane-level localizing the preceding motor vehicle with respect to itself.

Figure 3:
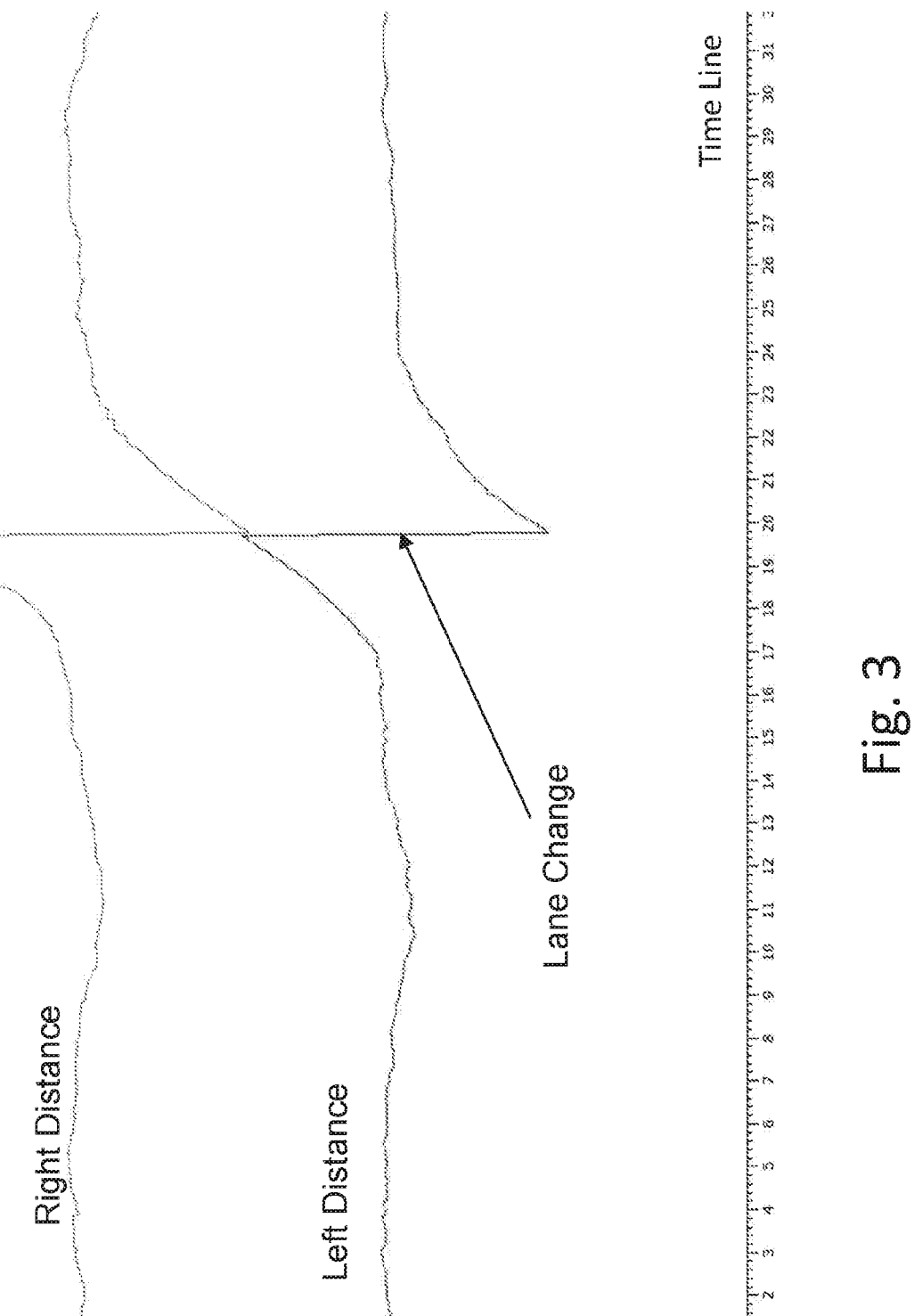
FIG. 3 shows time trends of the left and right distances of a motor vehicle from the left and right lane lines which delimit the lane the motor vehicle is traveling along.

FIG. 3 shows time trends of the right and left distances of the preceding motor vehicle from the right and left lane lines which delimit the lane the preceding motor vehicle is traveling along, in a situation in which the preceding motor vehicle changes lane and crosses the left lane line.

As it can be seen, during a lane change in which the preceding motor vehicle crosses the lane line, in the example shown the right lane, the trends of the right and left distances show corresponding sudden changes of opposite signs, at which the right distance varies from a low value to a high value, whereas the left distance varies from a high to a low value.

Therefore, by analysing the time trends of the left and right distances transmitted by the preceding motor vehicle, the following motor vehicle may thus detect and track the lane changes of the preceding motor vehicle, i.e., to determine both when the preceding motor vehicle changes lane based on the detection of a sudden change in the right and left distances, and the type of lane change made, i.e., whether it is to either the right lane or the left lane with respect to the current lane, based on the sign of the sudden change.

Figure 4:
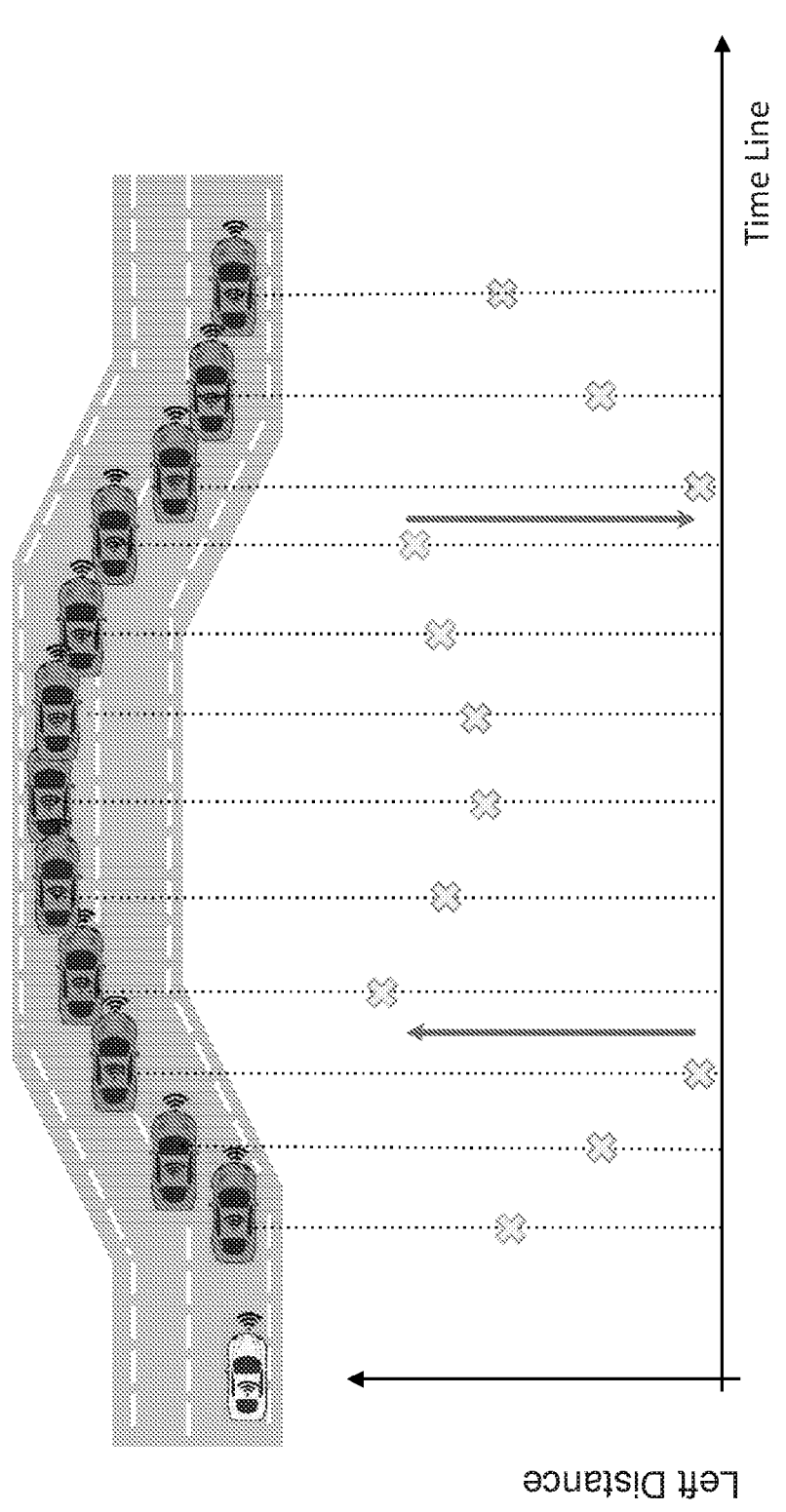
FIG. 4 shows a series of discrete values of the distance of a motor vehicle from a lane line which delimit the lane the motor vehicle is traveling along.

FIG. 4 shows a series of discrete values, depicted with crosses, of the left distance of the preceding motor vehicle from the left lane line successively transmitted by the preceding motor vehicle and received by the following motor vehicle and the sudden changes, depicted with arrows, of the left distance that the motor vehicle is able to determine based on the received vales of the left distance, which allow the following motor vehicle to determine occurrence of a first lane change of the preceding motor vehicle from the right to the left lane and subsequently a second lane change of the preceding motor vehicle from the left to the right lane.

The present invention therefore allows V2V-based ADAS applications to be implemented, such as, for example, the aforementioned emergency electronic braking light, slow vehicle warning, lane change assist and cooperative adaptive cruise control, which require a lane-level localization, not only in outdoor areas but also in so-called denied indoor areas, such as, for example, road tunnels, where GNSS coverage is lacking, such as GPS and GLONASS, Galileo, Beidou, QZSS, and for this reason called GNSS-denied areas, or where cellular coverage is lacking, or where both the above-mentioned coverages are lacking.

The present invention, in fact, is essentially based on the inter-vehicular communication, which does not necessarily require access to the cellular network, as well as the geo-location of the motor vehicles can be carried out using technologies other than the satellite one based on GNSS signals, for example on an estimated one known as Dead Reckoning, so that, unlike the other known technologies, the present invention is able to operate also in these denied areas, whose extension is usually limited.

Furthermore, the present invention is capable of operating not only in situations in which each current geographical position and each left and right distance of the preceding motor vehicle from the right and left lane lines which delimit the lane the preceding motor vehicle is traveling along are transmitted in real time, as soon as determined, in such a way that the following motor vehicle can receive them in real time, but also in a delayed manner, as part of a so-called path history formed by a time series of current geographical positions and right and left distances of the preceding motor vehicle determined in successive instants of time along the path of the preceding motor vehicle.

The latter mode is particularly useful just in denied areas, within each of which a motor vehicle can determine and store in the form of path history a time series of current geographical positions using a non-satellite geo-location technology and left and right distances based on the output of the ADAS camera, and then transmit the stored path histories once it has left the denied areas, as soon as the inter-vehicular connection is established. In this situation, the following motor vehicle does not have to wait for a large number of current geographical positions and left and right distances of the following motor vehicle to be collected before it can reconstruct the history of the positions between the two motor vehicles, but by using the path history it can, ideally, immediately retrieve the relative position of the preceding motor vehicle, provided, of course, that the path history extends as far as the current geographical position of the following motor vehicle.

The use of the path history is for example advantageous in a situation in which the preceding motor vehicle is initially out of the communication range of the following motor vehicle and is forced to stop in a lane. When the following motor vehicle enters the communication range of the preceding motor vehicle, if the following motor vehicle did not have the path history available, the estimation of the relative position of the preceding motor vehicle would be based on an almost unique sample of the geographical position and of the left and right distances of the following motor vehicle, so that the following motor vehicle would not be able to reconstruct the geometry of the road traveled by the preceding motor vehicle, and, consequently, would not be able to implement the technology of the present invention. Thanks to the reception of the path history of the preceding motor vehicle as soon as it enters the communication range of the latter, the following motor vehicle is able to overcome this limitation.

Figures 5, 6A, 6B:
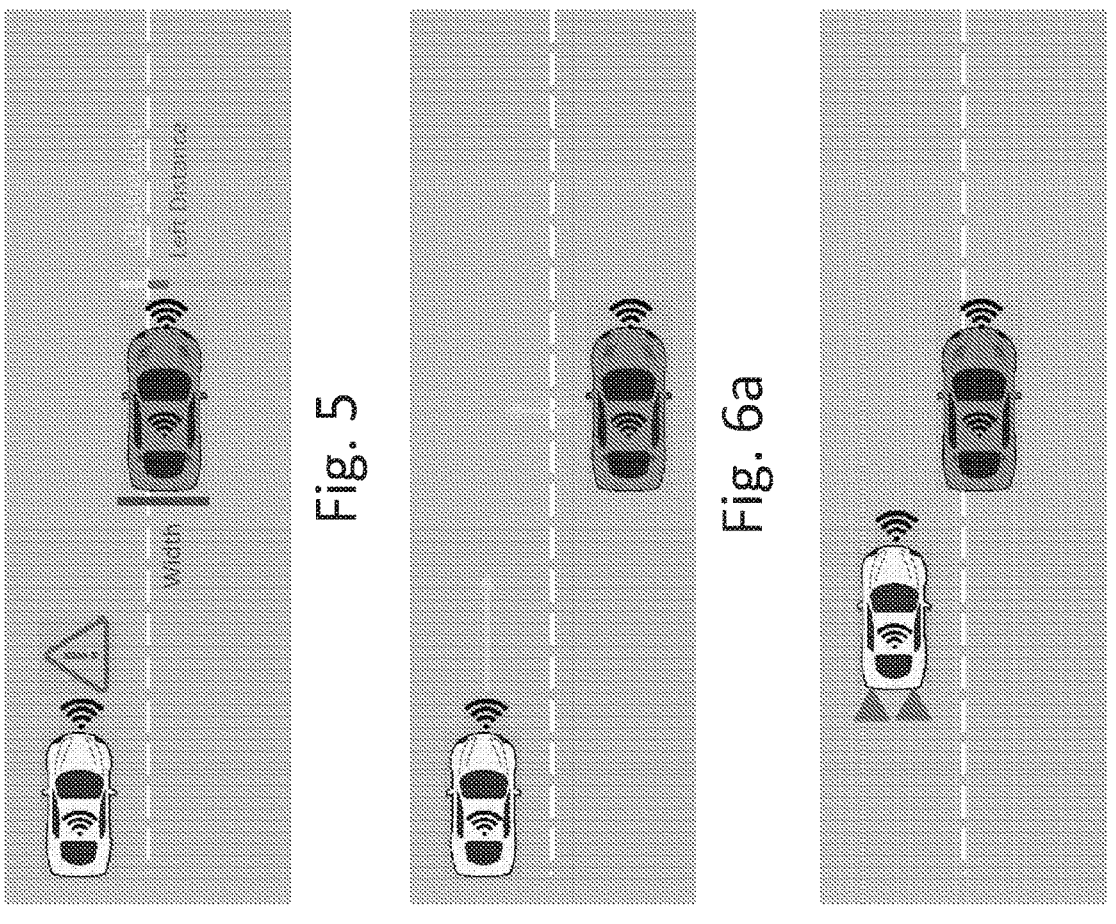
FIG. 5 shows a road scenario in which a preceding motor vehicle is traveling along a different lane than the one traveled by a following motor vehicle and which is proceeding in the same direction of travel but also partially obstructing the lane traveled by the following motor vehicle.
FIGS. 6a and 6b show a road scenario in which a preceding motor vehicle is traveling along a different lane than the one traveled by a following motor vehicle and which is proceeding in the same direction of travel but is performing a cut-in manoeuvre.

Thanks to the transmission of the right and left distances of the preceding motor vehicle from the right and left lane lines which delimit the lane the preceding motor vehicle is traveling along, the present invention also enables the following motor vehicle to reliably detect situations of the type like the one shown in FIG. 5, wherein the preceding motor vehicle is traveling along a different lane than the one being traveled by the following motor vehicle, but also partially obstructing the one traveled by the following motor vehicle and the one shown in FIGS. 6*a* and 6*b*, wherein the preceding motor vehicle is traveling along a different lane than the one of the preceding motor vehicle, but it is performing a so-called cut-in manoeuvre, i.e. it is progressively moving sideways within the lane that it is traveling towards the lane from the following motor vehicle and at a certain point it invades on the lane traveled by the following motor vehicle.

Figure 7:
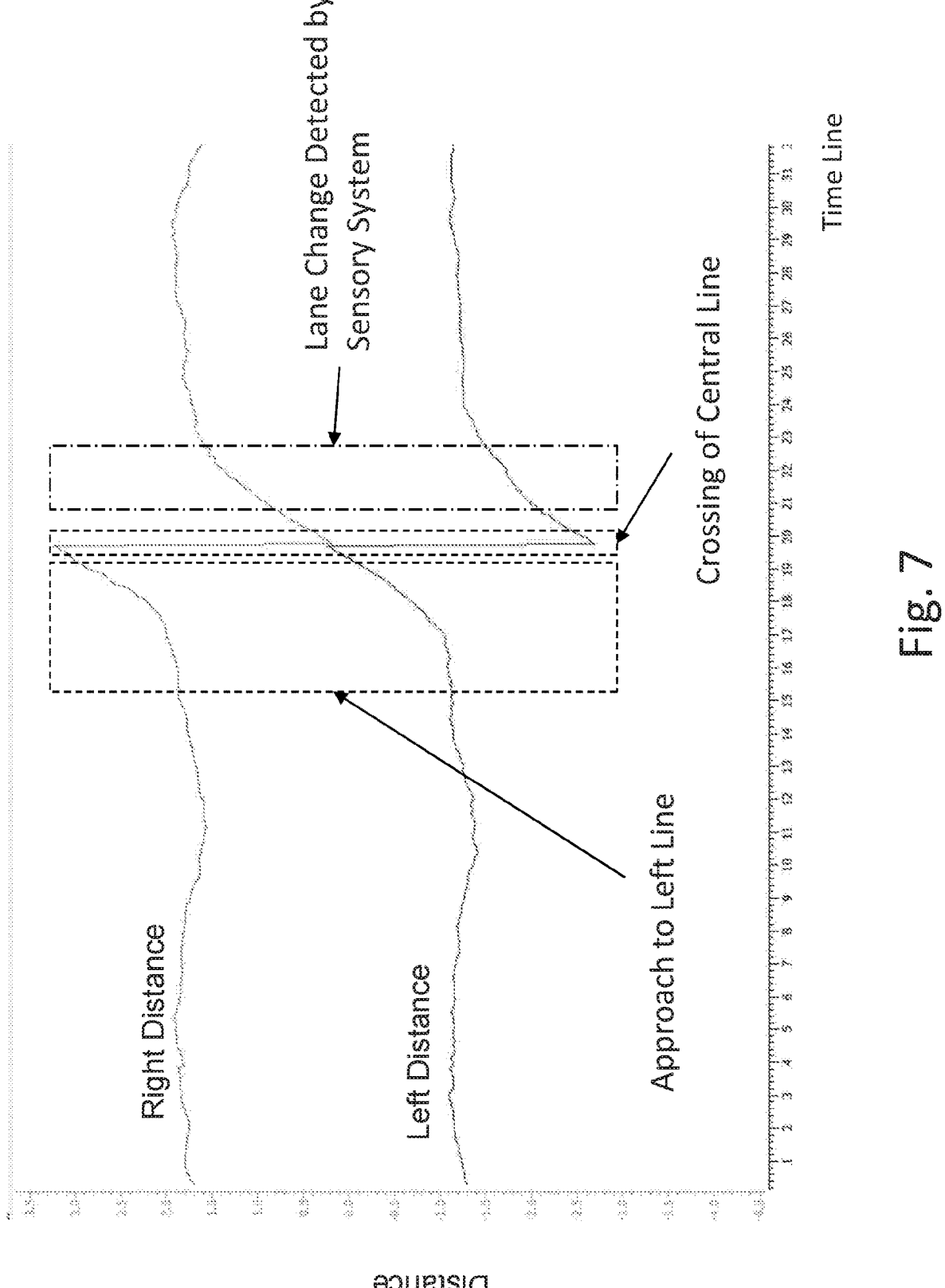
FIG. 7 shows time trends of the left and right distances of a motor vehicle from the left and right lane lines which delimit the lane the motor vehicle is traveling along, with indications of the progressive approach of the motor vehicle to a different lane, the subsequent crossing of the lane line and the advance with which the present invention allows the crossing of the lane line to be detected compared to a conventional automotive sensory system.

In this last scenario, in fact, by analysing the time trends of the right and left distances transmitted by the preceding motor vehicle shown in FIG. 7, the following motor vehicle is able to monitor the progressive approach of the preceding motor vehicle to its lane on the basis of the progressive relative change of the right and left distances and to detect the subsequent crossing of the lane line between the lane traveled by the preceding motor vehicle and the one traveled by the following motor vehicle at the sudden relative change of the right and left distances, significantly in advance with respect to the detection that would be possible to be made by a conventional automotive sensory system of the following motor vehicle, also shown in FIG. 7.

In addition to enabling a lane-level geo-location of motor vehicles, the present invention also provides a benefit at the infrastructure level by enabling the reconstruction of the road traveled by the motor vehicles.

Figure 8:
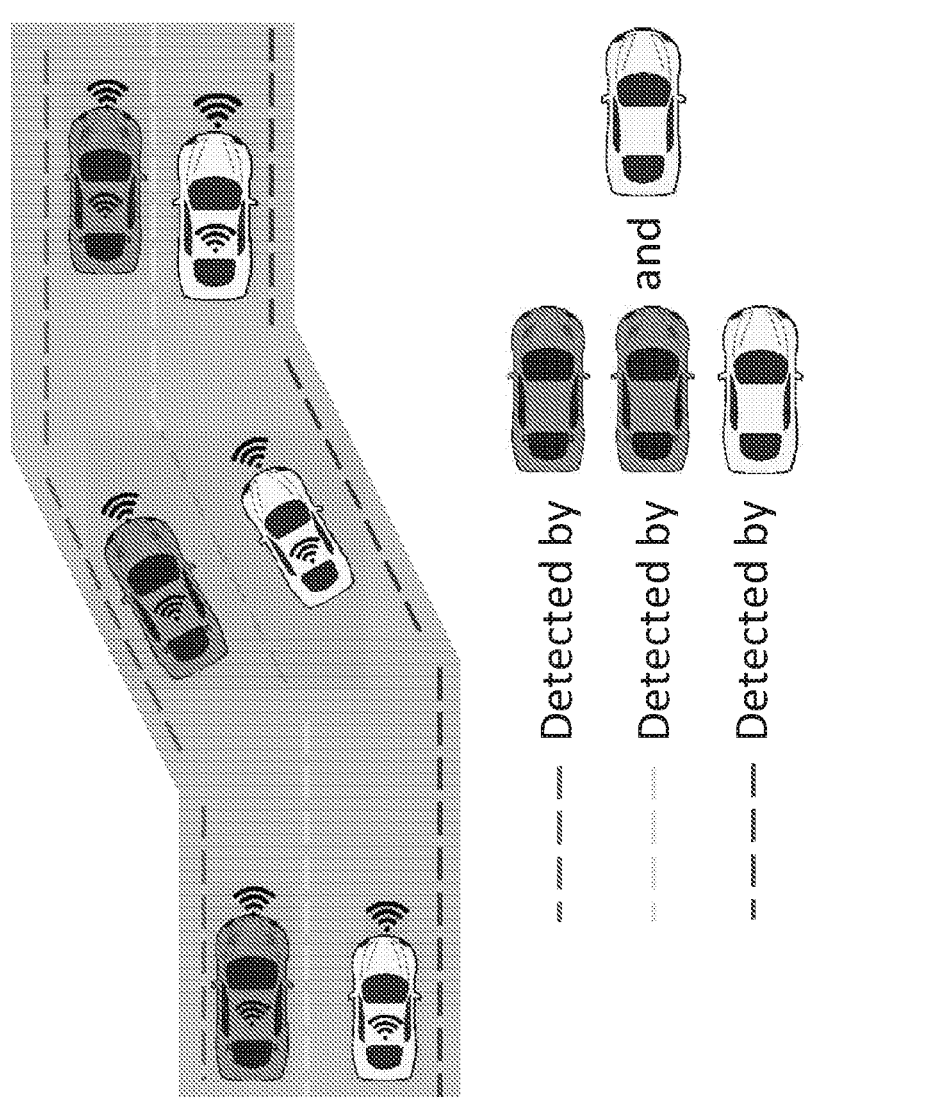
FIG. 8 shows a road section whose geometry can be reconstructed by an infrastructure based on data transmitted by two motor vehicles traveling along the road section and representative of the lane lines which delimit the right and left lanes recognised by the ADAS cameras of the two motor vehicles.

In fact, FIG. 8 shows a road section whose geometry can be reconstructed by an infrastructure based on data transmitted by two motor vehicles traveling along this road section and representative of the lane lines which delimit the right and left lanes recognised by the ADAS cameras of the two motor vehicles.

Figure 9:
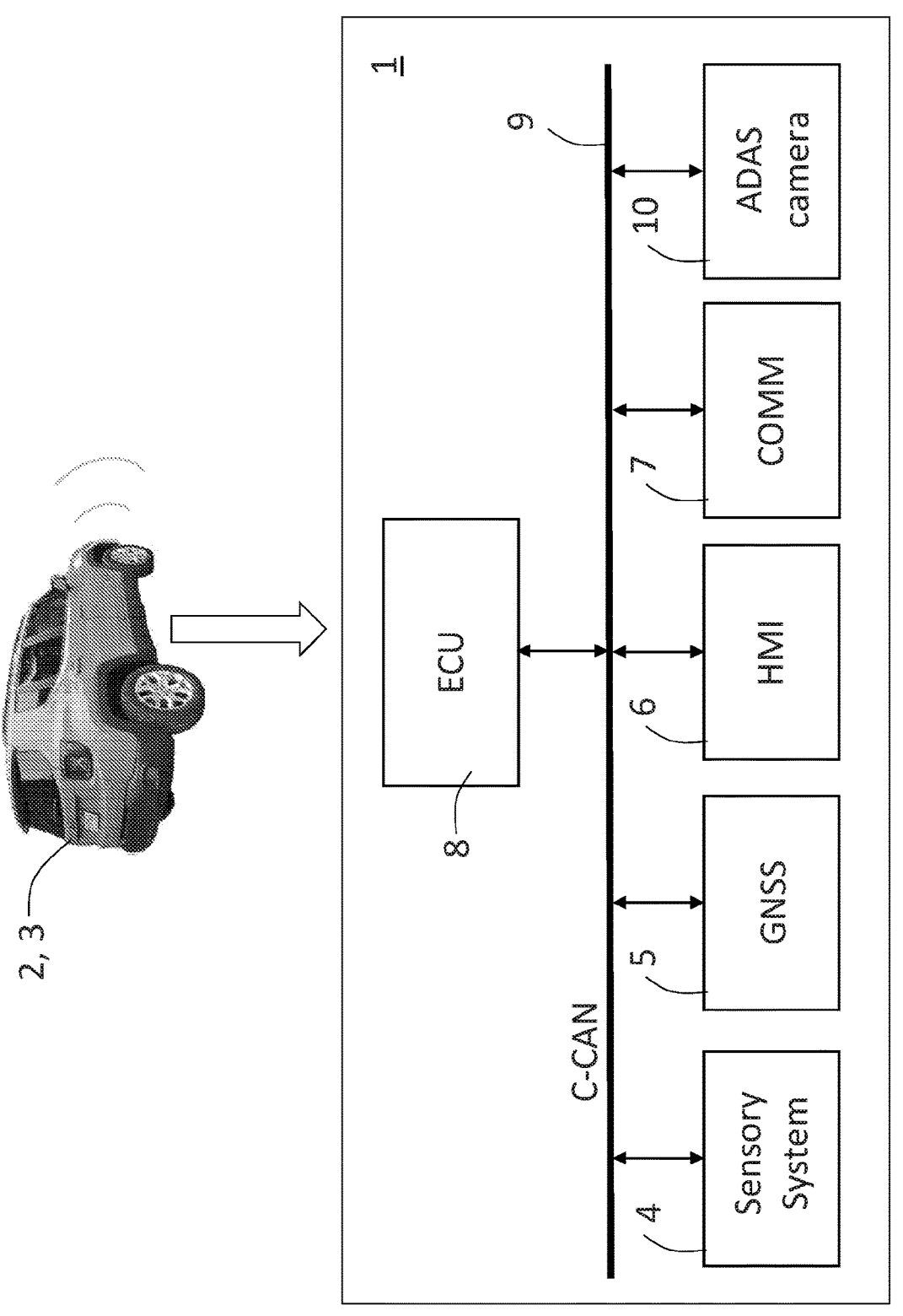
FIG. 9 shows a block diagram of an automotive cooperative map-free lane-level relative localization electronic system according to the present invention.

In the end, FIG. 9 shows a block diagram of an automotive electronic system 1 designed to allow automotive cooperative map-free lane-level relative localization based on inter-vehicular communication of two motor vehicles 2, 3 each equipped with such an automotive electronic system 1, in particular to allow a first motor vehicle 2, in the examples shown above represented by the following motor vehicle, to localize relative to itself a second motor vehicle 3, in the examples shown above represented by the preceding motor vehicle, as well as to the second motor vehicle 3 to localize the first motor vehicle 2 relative to itself.

The automotive electronic system 1 of each motor vehicle 2, 3 comprises:

an automotive sensory system 4 designed to output an output such as to allow right and left lane lines which delimit a lane traveled by the motor vehicle 2, 3 to be identified;

an automotive geo-location system 5 designed to output position data indicative of a geographical position of the motor vehicle 2, 3;

an automotive communication interface 7 designed to allow the motor vehicle 2, 3 to communicate with other motor vehicles through an inter-vehicular communication, known as or V2V communication, acronym for Vehicle-to-Vehicle, based on inter-vehicular or V2V messaging, and conveniently, but not necessarily, to allow the motor vehicle 2, 3 to communicate with an infrastructure not shown and consisting of, e.g., Road Side Units (RSU) installed on poles, panels or traffic lights at the roadside, known as V2I communication, acronym for Vehicle-to-Infrastructure, based on an infrastructure V2I messaging, thereby implementing a communication with anything, known as V2X communication, acronym for Vehicle-to-Everything; and automotive electronic storing and processing resources 8 designed to communicate, through an automotive communication network 9, such as a high-speed CAN, a FlexRAy or others, with the automotive sensor system 4 to receive the output therefrom, with the automotive geo-location system 5 to receive the position data therefrom, and with the automotive communication interface 7 and designed to store and execute a software comprising instructions which, when executed, cause the automotive electronic storing and processing resources 8 to become configured to allow the lane-level relative localization of the two motor vehicles 2, 3 in the manner described above.

As regards the automotive cooperative map-free lane-level relative localization, it is pointed out that what really matters are the operations which are implemented in order to carry out this functionality rather than the hardware and software architectures with which these operations are implemented, to such an extent that they could be implemented by means of a concentrated architecture, i.e., by a single automotive electronic control unit, or by a distributed cooperative architecture, i.e., distributed among several communicating and cooperating automotive electronic control units, depending on the hardware and software architectures that the automotive manufacturer deems appropriate in order to implement this functionality.

For this reason, and also for descriptive convenience, and without this being in any way considered limiting the hardware and software architectures, purely by way of example in the following description the automotive lane-level map-free relative localization will be described as entirely delegated to a single electronic automotive control unit, always identified by reference number 8.

The automotive geo-location system 5 is conveniently of the satellite type and comprises a GNSS receiver adapted to receive, via a GNSS antenna, radio signals, known as Signals in Space (SIS), transmitted by a constellation of satellites of a Global Navigation Satellite System (GNSS) and to compute, based on the received the Signals in Space, position data indicative of the absolute geographical position, in terms of latitude, longitude, height (altitude), direction and time of the motor vehicle on which the GNSS receiver is installed.

Alternatively, the automotive geo-location system 5 could be based on other present or future technologies, e.g., it could be based on SLAM (Simultaneous Localization and Mapping) techniques, which allow to reconstruct a digital map of an unknown environment and to localize oneself within the reconstructed digital map.

To allow a V2V or V2X communication to be achieved, the automotive communication interface 7 comprises a V2X data encoder configured to encode data streams into RF signals to be transmitted through a Dedicated Short-Range Communication (DSRC) antenna, and a V2X data decoder configured to decode RF signals received by a DSRC antenna into data streams, according to standard automotive data formats (SAE DSRC J2945-J2735 and ETSI ITS-G5).

The DSRC antenna can either be in the form of a single transmitting-receiving DSRC antenna or in the form of a separate transmitting DSRC antenna and receiving DSRC antenna, to transmit and receive RF signals that encode basic security messages and infrastructure messages.

To allow a V2V or V2X communication to be achieved, the automotive communication interface 7 is based on one or different long-range communication technologies, conveniently comprising present and future cellular communication technologies, such as, 2G, 3G, 4G, 5G, etc.

The automotive sensory system 4 is based on any present and future technology that allows the right and left lane lines which delimit the lane that motor vehicle 2, 3 is traveling along to be identified.

In one embodiment, the automotive sensory system 4 can be formed by the ultrasonic sensory system of the Park Assist system or, conveniently, by the automotive vision system of the Lane Keeping and Lane Centering systems.

In a different, preferred embodiment, the automotive sensory system 4 conveniently, but not necessarily, comprises an automotive front vision system comprising a standard production ADAS camera 10, i.e., the one traditionally used in ADASes currently on the market, which, depending on the standard production equipment of the motor vehicle 2, 3, may be a low resolution black and white camera or a high resolution colour camera.

The ADAS camera 10 incorporates a dedicated electronic digital image processor capable of performing several simultaneous processing operations on the digital images captured by the ADAS camera 10 to implement different applications, such as lane recognition, detection of moving and approaching motor vehicles, control of the distribution of the external lighting of the motor vehicle, detection of motor vehicles ahead, pedestrian detection, traffic sign recognition, etc.

In particular, as regards the embodiment of the present invention, the electronic digital image processor of the ADAS camera 10 is further designed to process the digital images captured by the ADAS camera 10 to recognise and output data representative of elements present in the captured digital images such as, in particular, the right and left lane lines which delimit the lane the motor vehicle 2, 3 is traveling along, as well as guardrails, obstacles, motor vehicles and vulnerable road users.

In a different embodiment, the processing of the digital images captured by the ADAS camera 10 for the purpose of recognising elements present therein may be delegated to electronic processing resources external to the ADAS camera 10, for example a central processing node of the motor vehicle 2, 3 dedicated to processing the digital images captured by all the on-board cameras of the motor vehicle 2, 3.

In order to allow the lane-level relative localization of the first motor vehicle 2 by the second motor vehicle 3, the automotive electronic storing and processing resources 8 of the first motor vehicle 2 are configured to:

receive from the automotive geo-location system 5 position data indicative of the geographical position of the motor vehicle 2, 3;

receive from the ADAS camera 10 recognition data representative of elements recognised in the digital images captured by the ADAS camera 10, including lane delimiting data representative of the right and left lane lines recognised in the digital images captured by the ADAS camera 10 and which delimit the lane traveled by the first motor vehicle 2;

compute, based on the lane delimiting data representative of the right and left lane lines that have been recognised in the digital images captured by the ADAS camera 10, one or both of the left and right distances of the first motor vehicle 2 from the right and left lane lines that have been recognised in the digital images captured by the ADAS 10 camera; and transmit, via the inter-vehicular communication interface 7, V2V messages containing position data received from the automotive geo-location system 5 and distance data representative of one or both of the left and right distances of the first motor vehicle 2 from the right and left lane lines that have been recognised in the digital images captured by the ADAS camera 10, for use by other motor vehicles nearby the first motor vehicle 2 and also capable of transmitting and receiving V2V messages.

The V2V messages transmitted can be Basic Safety Messages (BSMs) or Cooperative Awareness Messages (CAMs), or new messages under investigation by the automotive research community for a possible standardisation thereof, such as Cooperative Awareness Messages (CPM), Cooperative Sensing Messages (CSM) or Decentralized Environmental Notification Messages (DENM).

On the other hand, in order to allow the relative lane-level localization of the second motor vehicle 3 by the first motor vehicle 2, the electronic automotive control unit 8 of the first motor vehicle 2 is further programmed to:

receive, via the automotive communication interface 7, V2V messages transmitted by the second motor vehicle 3;

extract from the received V2V messages the position data indicative of the geographical position of the second motor vehicle 3 and the distance data representative of one or both of the left and right distances of the second motor vehicle 3 from the right and left lane lines that have been recognised in the digital images captured by the ADAS camera 10 of the second motor vehicle 3 and contained in the V2V messages received therefrom; and lane-level localize the second motor vehicle 3 relative to the first motor vehicle 2, i.e., determine whether the second motor vehicle 3 is traveling along the same or a different lane than the one traveled by the first motor vehicle 2, based on the geographical position of the first motor vehicle 2 outputted by the automotive geo-location system 5 thereof, on the right and left lane lines which delimit the lane traveled by the first motor vehicle 2 and which have been recognised based on the output of the automotive sensory system 4 thereof, and on the information extracted from the V2V messages transmitted by the second motor vehicle 3, which, as mentioned, comprise the geographical position of the second motor vehicle 3 outputted by the automotive geo-location system 5 thereof and one or both of the left and right distances from the right and left lane lines which delimit the lane traveled by the second motor vehicle 3 and which have been recognised by the automotive electronic storing and processing resources 8 of the second motor vehicle 3 based on the output of the automotive sensory system 4 thereof.

In particular, in order to lane-level localize the second motor vehicle 3 relative to the first motor vehicle 2, the electronic automotive control unit 8 of the first motor vehicle 2 is programmed to:

reconstruct a road scenario (with multiple lanes) in which the first motor vehicle 2 is moving based on the output of its automotive sensory system 4, wherein the reconstructed road scenario is of the type shown in FIG. 2, i.e., comprising the lane traveled by the first motor vehicle 2 and one or more lateral lanes; and localize the second motor vehicle 3 relative to the first motor vehicle 2 in the reconstructed road scenario, i.e., compute the geographical position of the second motor vehicle 3 in the reconstructed road scenario, based on the geographical position of the first motor vehicle 2 outputted by the automotive geo-location system 5 thereof, on the geographical position of the second motor vehicle 3 and one or both of the left and right distances of the second motor vehicle 3 from the right and left lane lines which delimit the lane traveled by the second motor vehicle 3 and contained in the V2V messages received therefrom, thus determining whether the second motor vehicle 3 is traveling along the same or a different lane than the one traveled by the first motor vehicle 2.

As previously mentioned, the road scenario (with multiple lanes) is accurately reconstructed at lane level by the electronic automotive control unit 8 of the first motor vehicle 2 based on the output of the automotive sensory system 4 thereof, and in particular based on the digital images captured by the ADAS camera 10.

Should the output of the automotive sensory system 4 of the first motor vehicle 2 so allow, all lanes of the road scenario are recognised based on the output of the automotive sensory system 4 thereof, in particular based on the digital images captured by the ADAS camera 10.

Should instead the output of the automotive sensory system 4 of the first motor vehicle 2 not so allow, the lanes of the road scenario are recognised in the way previously described, i.e., the lane traveled by the first motor vehicle 2 is recognized based on the output of the automotive sensory system 4, in particular it is recognized by the electronic processor of the ADAS camera 10 or by the electronic automotive control unit 8 based on the digital images captured by the ADAS camera 10, the processing of which, as said, allows one or both of the right and left lane lines which delimit the traffic lane traveled by the first motor vehicle 2 to be the recognised and, should only one of the lane lines be recognised in the digital images captured by the ADAS camera, assuming the unrecognised lane line as being parallel to the one recognised and placed at a distance from the latter which may be equal to the lane width computed last time that both right and left lane lines were recognised in the digital images captured by the ADAS camera 10 or equal to the average of the last n computed values of the lane width, or still equal to a lane width estimated through a Kalman filter, through recursive least squares with forgetting factor, or other estimation algorithms, or, if no lane width has been computed yet, equal to a standard lane width, whereas the lateral lanes are assumed as lanes being parallel to the one traveled by the first motor vehicle 2.

In order to instead localize the second motor vehicle 3 in the reconstructed road scenario, the electronic automotive control unit 8 of the first motor vehicle 2 is programmed to:

carry out a first localization of the second motor vehicle 3 relative to the first motor vehicle 2 (black dot shown in FIG. 2) based on the geographical positions of the first and second motor vehicle 2, 3 outputted by the respective automotive geo-location systems 5, in particular as the difference between the geographical positions of the first and second motor vehicle 2, 3, carry out a second localization of the second motor vehicle 3 relative to the first motor vehicle 2 in the reconstructed traffic scenario (white dots shown in FIG. 2), consisting of the possible geographical positions that the second motor vehicle 3 can assume in the reconstructed road scenario, based on one or both of the left and right distances of the second motor vehicle 3 from the right and left lane lines which delimit the lane traveled by the second motor vehicle 3 and contained in the V2V messages transmitted by it, and lane-level localize the second motor vehicle 3 relative to the first motor vehicle 2 based on the first and second localizations of the second motor vehicle 3 relative to the first motor vehicle 2, thus determining whether the second motor vehicle 3 is traveling in the same or a different lane than the one traveled by the first motor vehicle 2.

In one embodiment, in order to lane-localize the second motor vehicle 3 relative to the first motor vehicle 2 based on the first and second localizations of the second motor vehicle 3 relative to the first motor vehicle 2, the electronic automotive control unit 8 of the first motor vehicle 2 is programmed to identify the one among the possible geographical positions that can be assumed by the second motor vehicle 3 in the reconstructed road scenario that is the "closest", in terms of distance, to the geographical position of the second motor vehicle 3 contained in the V2V messages transmitted by it.

In a different embodiment, the lane-level localization of the second motor vehicle 3 relative to the first motor vehicle 2 could be carried out based on proprietary probabilistic criteria.

In fact, when it comes to measurements of physical quantities such as, in the present case, a geographical position or a distance from a lane line, each of these measurements comprise both the main information indicative of the measurement outputted by the relative automotive sensor or computed based thereon, and auxiliary information indicative of the reliability/uncertainty of the measurement, such as, for example, standard deviation, confidence interval, variance, covariance, information matrix, or any other information that is indicative of a variability (statistical or otherwise) of the measurement.

This auxiliary information can be both the result of a calibration and an estimation made in real time by the relevant automotive sensor (e.g., a geographical position measurement is unreliable if the power of the received GNSS signal is low, or lane recognition is unreliable if there is little contrast in the digital images captured by the ADAS camera), or a combination of the two.

In the examples considered above, the geo-location device to date provides, in addition to geographical position measurements, also information on the confidence ellipse, i.e., a multidimensional measure of the quality of positioning correlated to the covariance matrix. Similarly, the ADAS camera provides information on the standard deviation of the offset of the lane lines and also of the parameters on how the geometry thereof evolves as the distance varies (a polynomial representation of the line, where the left and right distance is simply the zero degree term).

The combination of this information is therefore the result of specific proprietary algorithms that process this information using probabilistic techniques.

For this reason, the lane-level localization of the second motor vehicle 3 relative to the first motor vehicle 2 could be carried out based on proprietary probabilistic criteria wherein the "closest" criterion in relation to the possible geographical positions that can be assumed by the second motor vehicle 3 in the reconstructed road scenario with respect to the geographical position of the second motor vehicle 3 contained in the V2V messages received therefrom could be extended to a "best" criterion in term of probability according to the probabilistic algorithm used.

The electronic automotive control unit 8 of each of the two motor vehicles 2, 3 is further programmed to detect and track traffic lane changes of the other motor vehicle 2, 3 based on the time trends of the one or both of the left and right distances contained in the V2V messages received therefrom.

To this end, the electronic automotive control unit 8 is programmed to detect sudden changes in the one or both of the left and right distances contained in the received V2V messages, which correspond to lane changes of the motor vehicle 2, 3 from which the V2V messages are received.

The automotive electronic control unit 8 of each of the two motor vehicles 2, 3 is further programmed to put on the automotive on-board communication network 9 data indicative of the computed relative localizations of each of the motor vehicles from which V2V messages are received for use by the automotive applications V2V that require this information.

Finally, the electronic automotive control unit 8 of each of the two motor vehicles 2, 3 may be programmed to cause a display of an automotive user interface 6 to display a virtual representation of the environment in front of or surrounding the motor vehicle 2, 3 (road, guardrails, obstacles, etc.) constructed based on information outputted by the automotive sensory system 4, along with the virtual representations of both motor vehicles 2, 3 in their respective traffic lanes.

Figure 10A:
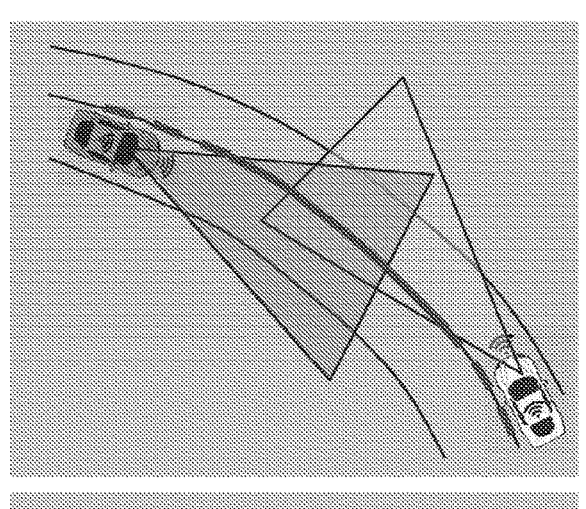
FIGS. 10*a* and 10*b* show how the present invention may be used to enable two motor vehicles proceeding in opposite directions of travel to be relatively lane-level localized.
Figure 10A:
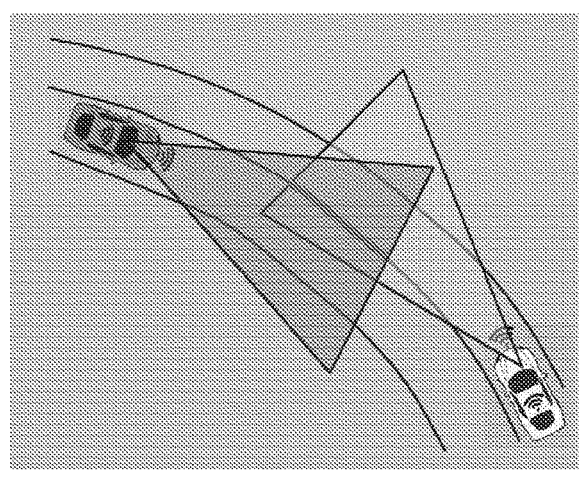
Figure 10A:
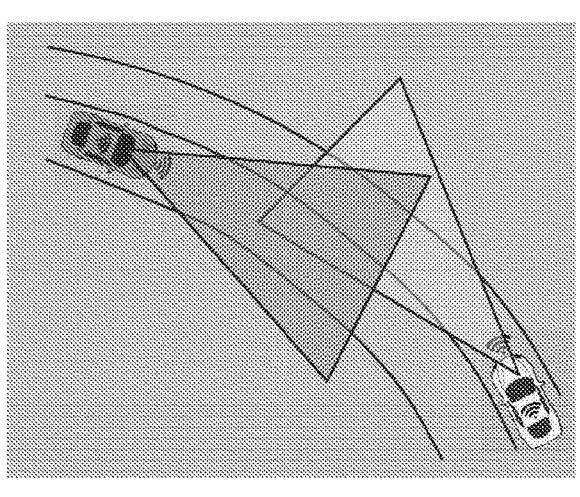
Figure 10B:
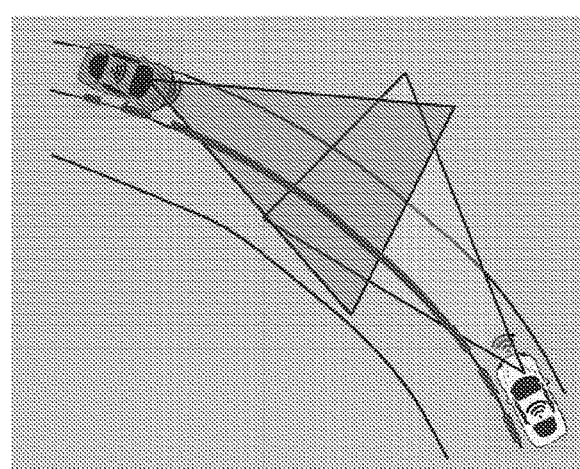
Figure 10B:
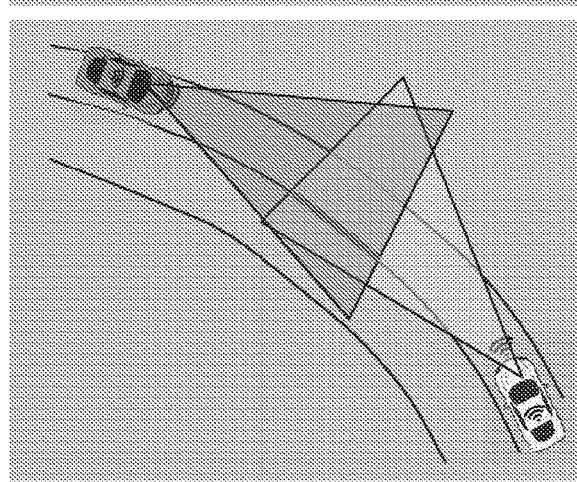
Figure 10B:
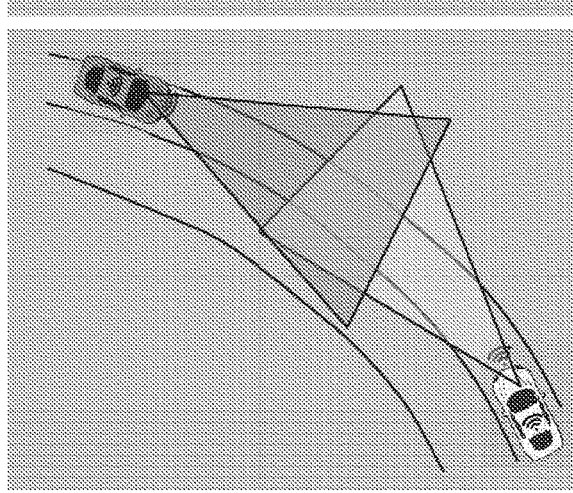

It goes without saying that the present invention can be used not only to enable the relative lane-level localization of the first and second motor vehicles 2, 3 in the road scenario described above, i.e., when the two motor vehicles 2, 3 are proceeding in the same direction of travel, but also in the road scenario shown in FIGS. 10*a* and 10*b*, i.e., when the two motor vehicles 2, 3 are proceeding in opposite directions of travel. In particular, in FIG. 10*a* the two vehicles 2 are depicted in different lanes, while in FIG. 10*b* the two motor vehicles 2 are depicted in the same lane due to the fact that one of the two motor vehicles has invaded the lane of the other motor vehicle, thus creating a real risk of a head-on collision between the two motor vehicles.

In both road scenarios shown in FIGS. 10a and 10b, both motor vehicles transmit, via inter-vehicular messages, position data indicative of the respective current geographical positions and data descriptive of the right and left lane lines of the respective lanes the motor vehicles are traveling along, and then estimate the probability that the lane lines detected by the sensory systems thereof will coincide with those transmitted by the other motor vehicle.

If at least the central lane line is detected by both motor vehicles, possibly after being projected for rough estimates beyond the field of vision of the automotive sensor systems, it is possible to assess whether the two motor vehicles are traveling in adjacent lanes (FIG. 10a) or in the same lane (FIG. 10b). This solution also works in the presence of curves, as long as the automotive sensory systems are such that they allow the road geometry to be adequately represented.

From an examination of the characteristics of the present invention, the advantages it allows to obtain are evident.

In particular, the present invention makes it possible to improve the localization precision of the traditional automotive satellite geo-location technology, bringing it to a map-free lane-level localization, let alone expensive high-resolution digital road maps, the use of which, however, is not precluded to strengthen the relative automotive localization according to the present invention, for example by improving the confidence of the estimation of left and right distances from the right and left lane lines of the lanes traveled by the motor vehicles.

In particular, the relative localization according to the present invention is advantageous not only for the following motor vehicle, but also for the preceding motor vehicle. For example, if the relative lane-level position of the following motor vehicle with respect to the preceding motor vehicle is known, the latter can accurately signal at the lane level that the lateral lane with respect to the one being traveled is occupied in a predictive manner, thus resulting in improvement over BUS technology, acronym for Blind Spot Information System, which is a short-range system designed to prevent collisions among motor vehicles by monitoring motor vehicles approaching from behind, alongside the motor vehicle in the so-called blind spot.

The relative localization according to the present invention is also advantageous for improving the absolute localization of a motor vehicle equipped with an automotive geo-location system with low precision by exploiting the position data outputted by an automotive geo-location system which is much more accurate than another motor vehicle. In fact, a relative localization of two motor vehicles based solely on the geographical positions outputted by the automotive geo-localization systems thereof has an intrinsically poor precision as the overall localization uncertainty is worse than the worst of the localization uncertainties of the automotive geo-location systems.

The present invention, on the other hand, makes it possible to achieve a high relative localization precision since it depends on the uncertainty of the automotive sensory systems of the two motor vehicles rather than on the uncertainty of the automotive geo-location systems, whereby the motor vehicle equipped with an automotive geo-location system with low precision is thus able to absolutely localize itself by exploiting the geographical position transmitted by the more performing automotive geo-location system of the other motor vehicle.

Just to give some numerical examples, consider the situation in which the first motor vehicle is equipped with an automotive geo-location system capable of outputting the geographical position with a precision of 1 metre, while the second motor vehicle is equipped with an automotive geo-location system capable of outputting the geographical position with a precision of 10 metres. A relative localization of two motor vehicles based solely on the geographical positions outputted by their automotive geo-location systems would therefore have a localization uncertainty of over 10 m. The present invention makes it possible to reduce the relative localization uncertainty to about 30 cm, which corresponds to the localization uncertainty of the automotive sensor system, in particular of an ADAS camera.

Another example would be where the first motor vehicle is equipped with an automotive geo-location system based on high-definition maps capable of allowing absolute lane-level localization, while the second motor vehicle is equipped with an automotive geo-location system with low precision that, therefore, does not allow either to determine in which lane the second motor vehicle is traveling or how many lanes the section of road traveled is made up of. The present invention thus enables the second motor vehicle, once localized relative to the first motor vehicle, to accurately determine its lane despite the fact that the precision of its automotive geo-location system does not permit this.

In addition, the relative localization according to the present invention also enables the validation of inter-vehicular messages exchanged between motor vehicles. For example, if a motor vehicle transmits CAM messages from which the motor vehicles receiving these messages estimate a motion of the motor vehicle that is contrary to that estimated by the relative localization, this makes it possible to determine that the CAM messages transmitted are unreliable.

Finally, the relative localization according to the present invention, although not requiring road maps of any kind to operate, may nevertheless benefit from the availability of digital road maps either in normal or standard definition (SD), such as those in automotive navigators, or in high definition (HD).

The invention claimed is:

1. An automotive electronic system configured for automotive cooperative lane-level relative localization based on inter-vehicular communication of two motor vehicles each equipped with such an automotive electronic system;

the automotive electronic system of each motor vehicle comprising:

an automotive sensory system including sensors configured to identify a right lane line and a left lane line to delimit a lane of travel for the motor vehicle on a roadway, the sensors further configured to generate an output identifying location of the right lane line and the left lane line;

an automotive geo-location system configured to output position data indicative of a geographical position of the motor vehicle;

an automotive communication interface configured for communication between the motor vehicle and other motor vehicles through an inter-vehicular communication based on inter-vehicular messaging; and automotive electronic storing and processing resources including a storage medium storing instructions that when executed by a processor cause the processor to communicate with the automotive sensory system to receive the output therefrom, communicate with the automotive geo-location system to receive the position data therefrom, and communicate with the automotive communication interface and to allow the lane-level relative localization of the two motor vehicles;

wherein to perform the lane-level relative localization of the first motor vehicle by the second motor vehicle, the instructions stored by the storage medium when executed by the processor further cause the processor to:

determine, based on the output of the automotive sensory system, one or both of the right and left lane lines which delimit the lane travelled by the first motor vehicle;

compute, based on the one or both of the determined right and left lane lines, one or both of right and left distances of the first motor vehicle from the identified right and left lane lines; and transmit to the second motor vehicle, via the inter-vehicular communication interface, inter-vehicular messages containing position data indicative of the geographical position of the first motor vehicle and distance data representative of the one or both of the right and left distances of the first motor vehicle from the identified right and left lane lines;

wherein to allow the lane-level relative localization of the second motor vehicle by the first motor vehicle, the instructions stored by the storage medium when executed by the processor further cause the processor to:

receive, via the automotive communication interface, inter-vehicular messages from the second motor vehicle and containing position data indicative of the geographical position of the second motor vehicle and outputted by the automotive geo-location system of the second motor vehicle, and distance data representative of one or both of the right and left distances of the second motor vehicle from one or both of the right and left lane lines delimit the lane travelled by the second motor vehicle and determined by the automotive electronic storing and processing vehicle resources of the second motor vehicle based on the output of the automotive sensory system thereof;

extract position and distance data contained in the inter-vehicular messages received by the second motor vehicle; and lane-level localize the second motor vehicle relative to the first motor vehicle, thus determining whether the second motor vehicle is traveling along the same or a different lane than the one travelled by the first motor vehicle, based on the geographical position of the first motor vehicle, on the one or both of the right and left lane lines which delimit the lane travelled by the first motor vehicle, and on the geographical position of the second motor vehicle and on one or both right and left distances of the second motor vehicle from one or both of the right and left lane lines which delimit the lane travelled by the second motor vehicle and which are extracted from the inter-vehicular messages transmitted by the second motor vehicle.

2. The Automotive electronic system of claim 1, wherein, in order to lane-level localize the second motor vehicle relative to the first motor vehicle, the automotive electronic storing and processing resources of the first motor vehicle are configured to:

reconstruct a road scenario in which the first motor vehicle is traveling based on the output of the automotive vehicle sensory system thereof; wherein the reconstructed road scenario comprises the lane travelled by the first motor vehicle and one or more lateral lanes than the one travelled by the first motor vehicle; and lane-level localize the second motor vehicle in the reconstructed road scenario based on the geographical positions of the first and second motor vehicle, on the geographical position of the second motor vehicle and on one or both of the right and left distances of the second motor vehicle from one or both of the right and left lane lines travelled by the second motor vehicle.

3. The Automotive electronic system of claim 2, wherein, in order to lane-level localize the second motor vehicle in the reconstructed road scenario, the automotive electronic storing and processing resources of the first motor vehicle are configured to:

carry out a first localization of the second motor vehicle relative to the first motor vehicle based on the geographical positions of the first and second motor vehicles;

carry out a second localization of the second motor vehicle relative to the first motor vehicle in the reconstructed road scenario and formed by the possible geographical positions that can be assumed by the second motor vehicle in the reconstructed road scenario, based on the one or both of the right and left distances of the second motor vehicle from the one or both of the right and left lane lines of the lane travelled by the second motor vehicle; and lane-level localize the second motor vehicle relative to the first motor vehicle in the reconstructed road scenario based on the first and second localizations of the second motor vehicle relative to the first motor vehicle in the reconstructed road scenario.

4. The Automotive electronic system of claim 3, wherein, in order to lane-level localize the second motor vehicle in the reconstructed road scenario, the automotive electronic storing and processing resources of the first motor vehicle are configured to:

identify, among the possible geographical positions of the second motor vehicle in the reconstructed road scenario, the geographical position either closest to the geographical position of the second motor vehicle or best according to a probabilistic criterion.

5. The Automotive electronic system of claim 1, wherein the automotive electronic storing and processing resources of the first motor vehicle are further configured to:

detect and track lane changes of the second motor vehicle based on time trends of the one or both of the right and left distances contained in the inter-vehicular messages transmitted by the second motor vehicle.

6. The Automotive electronic system of claim 5, wherein, in order to detect and track lane changes of the second motor vehicle, the automotive electronic storing and processing resources of the first motor vehicle are further configured to:

detect and track sudden changes in the one or both of the right and left distances contained in the inter-vehicular messages received from the second motor vehicle, to which lane changes of the second motor vehicle correspond.

7. The Automotive electronic system of claim 1, wherein the automotive electronic storing and processing resources of the first motor vehicle are further configured to:

enter on an automotive communication network (9) data indicative of the localization of the second motor vehicle relative to the first motor vehicle for use by automotive V2V applications that require this information.

8. The Automotive electronic system of claim 1, wherein the automotive electronic storing and processing resources of the first motor vehicle are further configured to:

cause on a display of an automotive user interface (6) to display a virtual representation of the environment in front of or surrounding the first motor vehicle and constructed based on the output of the automotive sensory system thereof, along with a virtual representation of the first and second motor vehicles n their respective lanes, so as to allow a driver of the first motor vehicle to visually localize the second motor vehicle with respect to the first motor vehicle.

9. The Automotive electronic system of claim 1, wherein the inter-vehicular communication between the first and the second motor vehicles is based on inter-vehicular messaging based on one of the following inter-vehicular messages: Basic Safety Messages (BSMs); Cooperative Awareness Messages (CAMs); Collective Perception Messages (CPM); Cooperative Sensing Messages (CSM); and Decentralized Environmental Notification Messages (DENM).

10. A software loadable in automotive electronic storing and processing resources of an automotive electronic system and configured to cause, when executed, the automotive electronic system to become configured as claimed in claim 1.

* * * * *